(12) United States Patent
Smith, Jr.

(10) Patent No.: US 7,830,302 B1
(45) Date of Patent: Nov. 9, 2010

(54) REMOTE SENSING OF WAVE HEIGHTS USING A NARROWBAND RADAR ARRANGEMENT

(75) Inventor: Jerry R. Smith, Jr., Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 369 days.

(21) Appl. No.: 12/152,127

(22) Filed: May 5, 2008

(51) Int. Cl.
*G01S 13/00* (2006.01)
*G01S 13/08* (2006.01)

(52) U.S. Cl. .................. 342/123; 342/26 R; 342/26 A; 342/26 B; 342/26 C; 342/26 D; 342/124

(58) Field of Classification Search .............. 342/26 R, 342/26 A, 26 B, 26 C, 26 D, 123, 124
See application file for complete search history.

(56) References Cited

U.S. PATENT DOCUMENTS

| | | | | |
|---|---|---|---|---|
| 2,147,810 | A * | 2/1939 | Alford | 342/122 |
| 2,256,539 | A * | 9/1941 | Alford | 342/128 |
| 4,101,891 | A * | 7/1978 | Fletcher et al. | 342/25 A |
| 4,481,517 | A * | 11/1984 | Brown | 342/22 |
| 4,595,925 | A * | 6/1986 | Hansen | 342/123 |
| 4,633,255 | A * | 12/1986 | Trizna | 342/192 |
| 4,988,885 | A * | 1/1991 | Lindstrom | 250/559.22 |
| 5,278,564 | A * | 1/1994 | Groenenboom | 342/123 |
| 5,469,168 | A * | 11/1995 | Anderson | 342/26 D |
| 5,642,330 | A * | 6/1997 | Santopietro | 367/131 |
| 5,703,594 | A * | 12/1997 | Anderson | 342/123 |
| 6,382,022 | B1 * | 5/2002 | Martinez et al. | 73/178 R |
| 7,138,941 | B1 * | 11/2006 | Smith, Jr. | 342/174 |
| 7,145,502 | B2 * | 12/2006 | Uebo et al. | 342/131 |
| 7,161,529 | B1 * | 1/2007 | Smith, Jr. | 342/159 |
| 7,218,268 | B2 * | 5/2007 | VandenBerg | 342/25 R |
| 7,265,710 | B2 * | 9/2007 | DeAgro | 342/120 |
| 7,479,921 | B2 * | 1/2009 | Iritani et al. | 342/118 |
| 7,486,226 | B2 * | 2/2009 | Edvardsson | 342/118 |
| 7,589,664 | B2 * | 9/2009 | Jirskog | 342/124 |

OTHER PUBLICATIONS

Jerry R. Smith Jr., Steven J. Russell, Barry E. Brown, Paul M. Haldeman Jr., D. Dan Hayden, Donald G. Morgan, Robert D. Pierce, Jerry W. Shan, William T. Stephens III, and Mark S. Mirotznik, "Electromagnetic Forward-Scattering Measurements Over a Know, Controlled Sea Surface at Grazing IEEE Transactions on Geoscience and Remote Sensing," 11 pages, 2004.

Jerry R. Smith Jr. and Robert J. Burkholder, "Channeling Phenomenon in Electromagnetic Forward Scattering a Low Grazing" IEEE Transactions on Geoscience and Remote Sensing, vol. 42, No. 8 Aug. 2004.

* cited by examiner

*Primary Examiner*—Thomas H Tarcza
*Assistant Examiner*—Peter M Bythrow
(74) *Attorney, Agent, or Firm*—Dave A. Ghatt

(57) ABSTRACT

A narrowband radar arrangement having a radar transmitter and a radar receiver mounted above a targeted water surface to monitor and determine a sea state of the targeted water surface. Fixed frequency signals are transmitted by the transmitter and received by the receiver, via a direct path and via a forward scattered path off the targeted water surface. An interference pattern of interfering direct path signals and forward scattered signals is used to determine an instantaneous height of the water surface and also to determine the sea state of the targeted water surface.

18 Claims, 3 Drawing Sheets

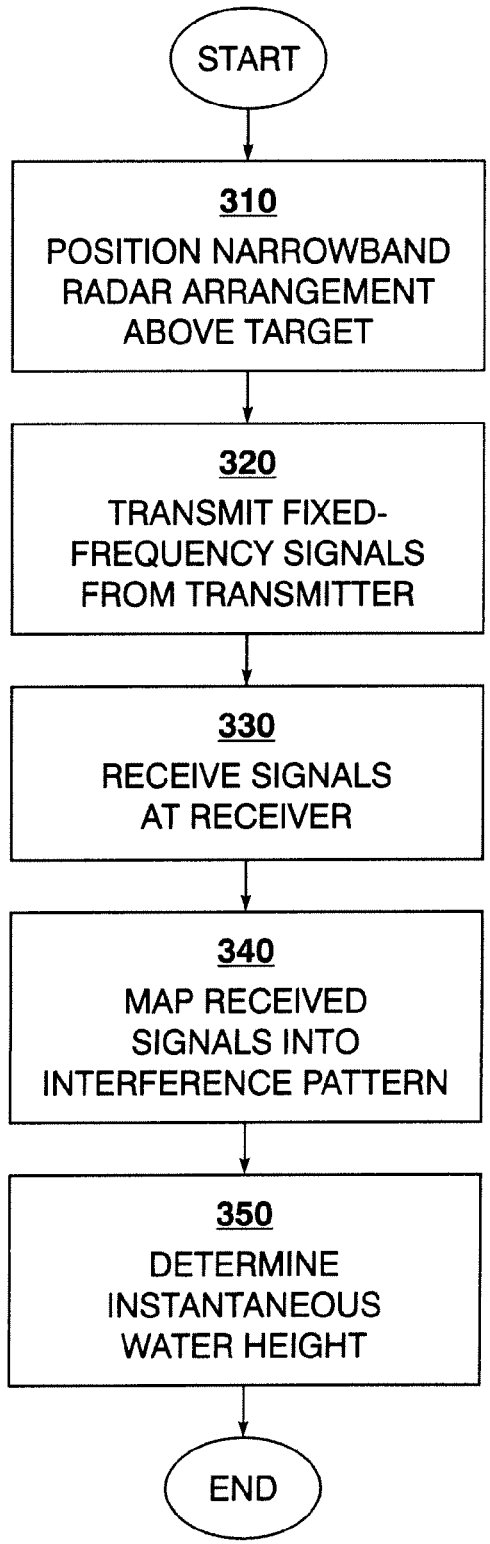

REMOTE SENSING OF WAVE HEIGHTS USING A NARROWBAND RADAR ARRANGEMENT

STATEMENT OF GOVERNMENT INTEREST

The following description was made in the performance of official duties by employees of the Department of the Navy, and, thus the claimed invention may be manufactured, used, licensed by or for the United States Government for governmental purposes without the payment of any royalties thereon.

RELATED PATENT APPLICATION

This application is related to concurrently filed U.S. non-provisional patent application, Ser. No. 12/152,124, filed on May 5, 2008, U.S. Pat. No. 7,808,426, hereby incorporated by reference, entitled "Remote Sensing of Wave Heights Using a Broadband Radar Arrangement," by inventor Jerry Rosson Smith Jr.

TECHNICAL FIELD

The following description relates generally to a system and a method for detecting and monitoring a sea state, more particularly, a system and method for calculating an instantaneous water height and generating a surface water profile using a narrowband radar arrangement positioned above a targeted surface.

BACKGROUND

Surface conditions in open water are monitored for various oceanographic and maritime reasons. The ability to monitor surface conditions from remote locations is particularly advantageous. Various methods of measuring surface conditions such as wave heights and the like are currently available. In terms of remote analysis, most methods involve measuring the wind speed remotely or counting transient anomalies, such as sea spike statistics to estimate the sea state. It is desired to have an economical system that remotely and accurately measures wave heights and open water surface profiles. It is also desired to have a wave height and surface profile detecting system that is operable and provides accurate reading in different environmental conditions.

SUMMARY

In one aspect, the invention is a method of remotely monitoring and determining a sea state. The method includes the positioning of a narrowband radar arrangement above a targeted water surface. In this aspect, the narrowband radar arrangement includes a transmitter and a receiver, wherein the transmitter and the receiver are spatially arranged with respect to each other, at extreme ends of the targeted water surface. The method includes the transmitting fixed frequency signals from the transmitter during a predetermined period. The method further includes the receiving of received signals at the receiver, during the predetermined period. In this aspect, the received signals are a combination of waves transmitted directly from the transmitter to the receiver and forward scattered signals reflected off the targeted water surface. The method further includes the mapping of an interference pattern tracking energy changes over the predetermined period, based on received signals. In this aspect, the method further includes the determining of an instantaneous surface water height of the targeted water surface based on the interference pattern.

In another aspect, the invention is a system for monitoring and determining a sea state. The system includes a narrowband radar arrangement above a targeted water surface in which the narrowband radar arrangement includes a transmitter for transmitting fixed frequency signals. The narrowband radar arrangement further includes a receiver for receiving received signals at the receiver. In this aspect, the received signals are a combination of signals transmitted directly from the transmitter, as well as forward scattered signals reflected from the targeted water surface. The transmitter and the receiver are spatially arranged with respect to each other at extreme ends of the targeted water surface. The system further includes a computer-readable medium bearing a program code for monitoring and determining a sea state. The program code includes one or more program code segments for receiving the received signals from the radar receiver, for mapping an interference pattern tracking energy changes based on received signals, and for determining an instantaneous surface water height of the targeted water surface based on the mapped interference pattern.

BRIEF DESCRIPTION OF THE DRAWINGS

Other features will be apparent from the description, the drawings, and the claims.

FIG. 3 is a flowchart of a method of monitoring and determining a sea state, according to an embodiment of the invention.

DETAILED DESCRIPTION

Figure 1A:
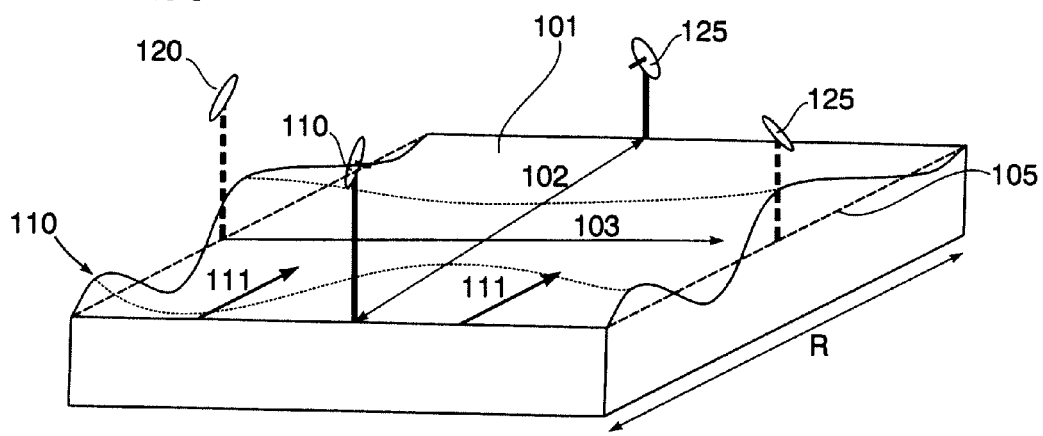
FIG. 1A is a schematic illustration of a narrowband radar arrangement in a system for monitoring and determining a sea state, according to an embodiment of the invention.

FIG. 1A is a schematic illustration of possible narrowband radar arrangements in a system for monitoring and determining a sea state, according to an embodiment of the invention. As outlined below, the system is equipped to extract an instantaneous wave height and a surface spectrum for meteorological or other purposes. FIG. 1A shows a narrowband radar arrangement (120, 125) which includes a transmitter 120 for transmitting uniform frequency signals for a predetermined transmitting period. FIG. 1A also shows a receiver 125 for receiving signals for the duration of the period. Although the arrangement transmits signals at a fixed frequency, the arrangement may be equipped with a frequency modulation device for changing the frequency at which the fixed signal is transmitted.

The radar arrangement (120, 125) is mounted above a targeted water surface 101 for monitoring the surface and determining a sea state of the water surface. The targeted water surface 101 may be part of a large body of water, such as an ocean, river, lake or the like. The radar arrangement may be fixed in a substantially stationary position by bottom mounting. Alternatively, the radar arrangement may be mounted on a floating device. Both the transmitter 120 and the receiver 125 may be vertically adjustable, regardless of the manner in which the radar arrangement is mounted. The narrowband arrangement (120, 125) as outlined is typically more economical than other radar arrangements in which spectrally spread-apart signals are transmitted.

FIG. 1A also shows a wind direction 111, which is substantially parallel to a horizontal path 102 from transmitter 120 to receiver 125. Winds traveling in the direction 111 create waves 110 that are substantially perpendicular to the horizontal path 102. FIG. 1A also shows in dotted lines, a possible location of the radar arrangement (120, 125), establishing an alternative horizontal path 103. In the alternative arrangement, the horizontal path 103 is substantially perpendicular to the wind direction 111, which creates waves 110 that are substantially parallel to the horizontal path 103. It should be noted that although FIG. 1A shows the radar arrangement (120, 125) in only two orientations, the radar transmitter 120 and radar receiver 125 may be mounted in any desired direction, thereby having a direct path that forms any possible angle with the waves 110.

Figure 1B:
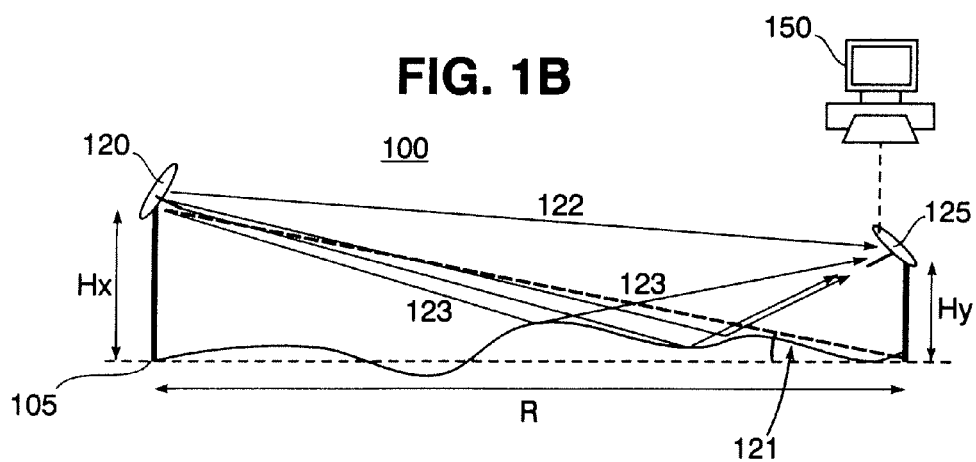
FIG. 1B is a schematic illustration of a system for monitoring and determining a sea state, according to an embodiment of the invention.

FIG. 1B is a schematic illustration of a system 100 for monitoring and determining a sea state, according to an embodiment of the invention. FIG. 1B shows the radar arrangement (120, 125) with the transmitter 120 and the receiver 125 being spaced apart by a distance R. FIG. 1B also shows the transmitter 120 being mounted at a height $H_X$ above a mean water height 105 of water surface 101 and the receiver 125 being mounted at a height $H_R$ above the mean water height 105 of the surface 101. In open seas for example, the mean water height 105 is about equal to the sea level height. In the system 100, the transmitter 120 is mounted higher than the receiver 125, therefore the height $H_X$ is greater than the height $H_R$. FIG. 1B also shows the both the transmitter 120 and the receiver 125 pointing downwards towards the targeted surface 101. A look down angle 121 is shown, and is defined as the elevation angle of the transmitter 120 at the base of the receiver 125. Depending on the environmental conditions, the look down angle 121 may be varied by vertically adjusting the height $H_X$ of the transmitter above the water surface 101. The radar receiver height $H_Y$ may also be adjusted to correspond to the positioning of the transmitter 120.

FIG. 1B also shows the receiver 125 electronically connected to a computer 150, for receiving data from the receiver 125. The computer 150 may be at the site of the targeted water surface 101. Alternatively, the computer may be positioned at a location remote to the targeted water surface 101, at a land-based location or on a surface or subsurface water vessel, for example. The computer 150 includes a computer-readable medium bearing a program code for monitoring and determining an instantaneous water height and the prevailing sea state. Although FIG. 1B shows the computer 150 electronically connected to the receiver 125, the computer may be electronically connected to any element in the broadband arrangement, including the radar transmitter 120.

In operation, the radar transmitter 120 transmits radio waves at a fixed frequency, which are received by the receiver 125. The radio waves are received via a direct path 122 and also by a forward scattered path 123 off the water surface. The radar arrangement (120, 125) may be a system that operates in at a desired fixed frequency within the X-band frequency range. As stated above, the fixed frequency at which the signals are transmitted may be adjusted using a modulation device. In one embodiment, the transmitter 120 transmits narrowband signals at a fixed frequency between 8 GHz and 12 GHz. The distance R may be about 50 m to about 70 m, and the radar transmitter 120 may be positioned at a height $H_X$ above the water surface 101 of about 1 m to about 5.5 m above the targeted water surface 101, and the radar receiver 125 may be positioned at height $H_Y$ above the water surface 101 of about 0.7 m to about 1.8 m. In another embodiment the distance R may be about 1 km to about 2 km. It should be noted that the distance R between the transmitter 120 and the receiver 125 may be any desired distance, provided that the direct path 122 is maintained. Thus R may several kilometers long, up to about 16 km. When R is about 16 km, the heights ($H_X$, $H_R$) of the transmitter 120 and receiver 125 would be in the order of about 7.5 m to about 30.5 m.

Figure 2:
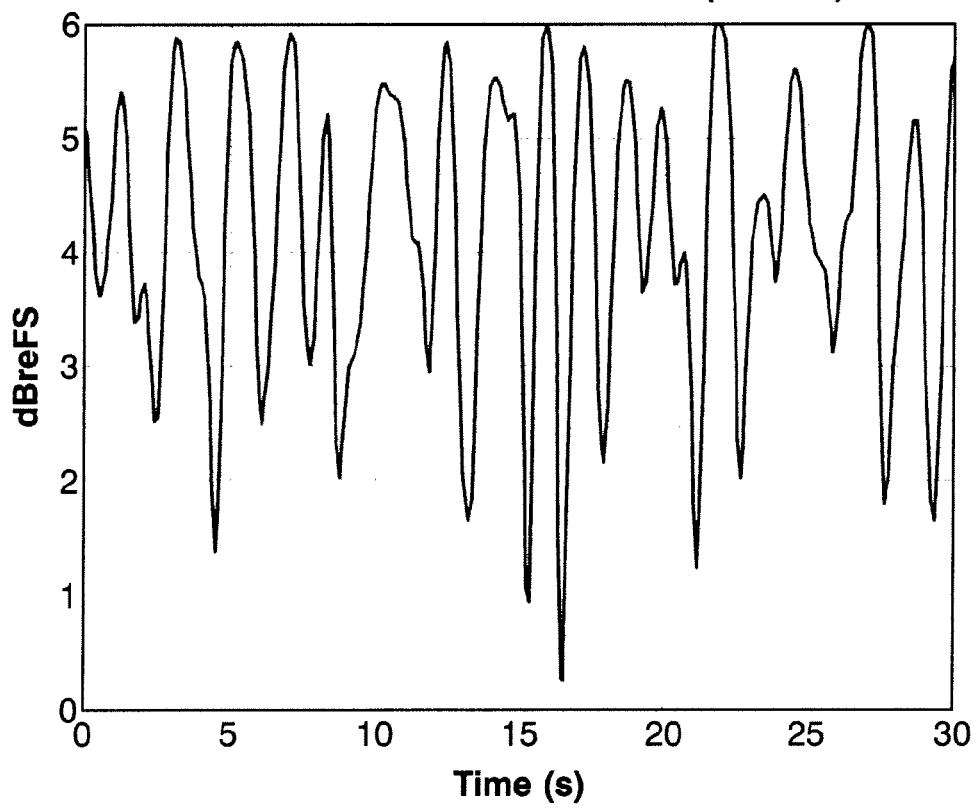
FIG. 2 is an exemplary illustration of an interference pattern tracking energy changes, according to an embodiment of the invention.

As stated above, the signals received by the receiver 125 are then transmitted to the computer 150. As shown in FIG. 1B, the received signals at the receiver are a combination of the direct path signals 122 and the forward scattered signals 123. When the computer 150 receives the signals from the radar receiver 125, the signals are mapped into an interference pattern 200. The interference pattern 200 tracks energy changes at the fixed frequency for a predetermined time. An exemplary interference pattern 200 is shown in FIG. 2, illustrating the interference between the direct path signals 122 and the forward scattered signals 123. Because the interference pattern 200 is completed for a fixed frequency value, the pattern 200 essentially tracks the time changes in the received energy at the given frequency, which in this exemplary embodiment is about 10 GHz. As will be outlined below, based on the interference pattern the computer 150 determines an instantaneous surface water height of the targeted water surface, and a surface water profile.

Using a geometric optics scattering model for received field, the instantaneous wave height is given by equation (1):

$$\delta = \frac{H_X + H_R \pm \frac{1}{\kappa}\sqrt{\left[\arccos\left(\frac{1}{2}|E_C| - 1\right) + 2\pi n + \kappa R_{DP}\right]^2 - \kappa^2 R^2}}{2} \quad (1)$$

According to equation (1), $\delta$ is the instantaneous height relative to a mean water height 105. As illustrated in FIG. 1B, $H_X$ is the height of the radar transmitter above the mean water height 105, and $H_R$ is the height of the radar receiver above the mean water height 105. $\kappa$ is a wave number for the radar system in which $\kappa$ is given by equation (2):

$$\kappa = 2\pi/\lambda \quad (2)$$

In equation (2), $\lambda$ is the wavelength of the narrowband radar waves. As shown in FIGS. 1A and 1B, R is the horizontal distance between the radar transmitter 120 and the radar receiver 125. According to equation (1), n is an index integer, which corresponds to a possible mathematical solution. $R_{DP}$ is the direct path length of the distanced traveled by waves transmitted directly from the radar transmitter to the radar receiver and is given by the equation (3):

$$R_{DP} = \sqrt{R^2 + (H_X - H_R)^2} \quad (3)$$

In equation (1), $E_C$ represents an instantaneous calibrated measured field at the receiver 125, and is determined from the interference pattern 200.

As stated above, the computer 150 includes a computer-readable medium bearing a program code for monitoring and determining an instantaneous water height and the prevailing sea state. The program code includes one or more code segments for receiving the signals from the radar receiver 125, and for mapping an interference pattern 200, based on the received signals. The code segments also provide for determining an instantaneous water height $\delta$ based on the interference pattern 200. Equation (1) is the formula used for the calculation of the instantaneous height δ. Calculations may be made for $E_C$ having zero and non-zero values. The one or more program code segments also provide for the generation of a surface water spectrum. A plurality of instantaneous height determinations are made in order to properly determine the surface water spectrum.

FIG. 3 shows the method 300 of monitoring and determining a sea state. The steps involved in the method 300 of monitoring and determining the sea state have been outlined above in detail in the description with respect to FIGS. 1A-2. Step 310 is the positioning of the narrowband radar arrangement 100 above the targeted water surface 101, the narrowband radar arrangement having a transmitter 120 and a receiver 125. As outlined and as illustrated in FIGS. 1A and 1B, the transmitter and the receiver are spatially arranged with respect to each other at extreme ends of the targeted water surface 101.

Step 320 is the transmitting of fixed frequency signals from the transmitter 120, during a predetermined period. Step 330 is the receiving of received signals at the receiver 125 during the predetermined period. As outlined above, the received signals are a combination of signals transmitted directly from the transmitter 120 to the receiver 125 and forward scattered waves reflected off the targeted water surface 101. Step 340 is the mapping of an interference pattern 200 tracking energy changes during the predetermined period based on received signals. Step 350 is the determining of an instantaneous surface water height δ of the targeted water surface 101 based on the interference pattern. As outlined above, the instantaneous height δ is calculated using the variables of equation (1), and a plurality of instantaneous heights δ may be calculated in order to generate a surface profile.

What has been described and illustrated herein are preferred embodiments of the invention along with some variations. The terms, descriptions and figures used herein are set forth by way of illustration only and are not meant as limitations. Those skilled in the art will recognize that many variations are possible within the spirit and scope of the invention, which is intended to be defined by the following claims and their equivalents, in which all terms are meant in their broadest reasonable sense unless otherwise indicated.

What is claimed is:

1. A method of monitoring and determining a sea state, the method comprising:
   positioning a narrowband radar arrangement above a targeted water surface, the narrowband radar arrangement having a transmitter and a receiver, wherein the transmitter and the receiver are spatially arranged with respect to each other at extreme ends of the targeted water surface;
   during a predetermined period, transmitting signals at a fixed frequency level from the transmitter;
   during the predetermined period, receiving received signals at the receiver, wherein the received signals are a combination of waves transmitted directly from the transmitter and forward scattered waves reflected from the targeted water surface;
   mapping an interference pattern tracking energy changes over the predetermined period, based on received signals;
   determining an instantaneous surface water height of the targeted water surface based on the interference pattern.

2. The method of monitoring and determining a sea state of claim 1, further comprising:
   repeating the determining of an instantaneous surface water height a plurality of times to obtain a plurality of instantaneous surface water heights during said predetermined period;
   generating a surface spectrum of said targeted surface water based on the plurality of instantaneous surface water heights.

3. The method of monitoring and determining a sea state of claim 2, wherein in the determining of the instantaneous water height, the instantaneous surface water height is given by the equation:

$$\delta = \frac{H_X + H_R \pm \frac{1}{\kappa}\sqrt{\left[\arccos\left(\frac{1}{2}|E_C| - 1\right) + 2\pi n + \kappa R_{DP}\right]^2 - \kappa^2 R^2}}{2}$$

wherein δ is the instantaneous height relative to a mean water height, $H_X$ is the height of the radar transmitter above the mean water height, $H_R$ is the height of the radar receiver above the mean water height, κ is the wave number for the radar system in which κ=2π/λ, wherein λ is the wavelength of radar waves, R is the horizontal distance between the radar transmitter and the radar receiver, n is an integer, $E_C$ is an instantaneous calibrated measured field at the receiver, and $R_{DP}$ is the direct path length of the distanced traveled by waves transmitted directly from the radar transmitter to the radar receiver and is given by the equation;

$R_{DP} = \sqrt{R^2 + (H_X - H_R)^2}$.

4. The method of monitoring and determining a sea state of claim 3, wherein received signals are transmitted to a computer, wherein the computer maps the received signals into the interference pattern, wherein the computer determines the plurality of instantaneous surface water heights, and wherein the computer generates the surface spectrum.

5. The method of monitoring and determining a sea state of claim 4, wherein the computer is remotely located with respect to the targeted water surface.

6. The method of monitoring and determining a sea state of claim 3,
   wherein in the positioning of the narrowband radar arrangement above a targeted water surface, a direction of signal transmission from the transmitter to the receiver is substantially parallel to the wind direction so that waves generated in the targeted water are substantially perpendicular to the direction of the transmission.

7. The method of monitoring and determining a sea state of claim 3,
   wherein in the positioning of the narrowband radar arrangement above a targeted water surface, a direction of signal transmission from the transmitter to the receiver is substantially perpendicular to the wind direction so that waves generated in the targeted water are substantially parallel to the direction of the transmission.

8. The method of monitoring and determining a sea state of claim 3, wherein the fixed frequency is a frequency between about 8 GHz and about 12 GHz.

9. The method of monitoring and determining a sea state of claim 8, wherein in the positioning the narrowband radar arrangement above a targeted water surface, the radar transmitter is positioned at about 1 m to about 5.5 m above the targeted water surface, the radar receiver is positioned at about 0.7 m to about 1.8 m.

10. The method of monitoring and determining a sea state of claim 9, wherein in the positioning the narrowband radar arrangement above the targeted water surface the radar transmitter and the radar receiver are spatially separated by about 50 m to about 70 m.

11. The method of monitoring and determining a sea state of claim 8, wherein in the positioning the narrowband radar arrangement above the targeted water surface the radar transmitter and the radar receiver are spatially separated by about 1 km to about 2 km.

12. A system for monitoring and determining a sea state, the system comprising:
   a narrowband radar arrangement above a targeted water surface, the narrowband radar arrangement comprising:
      a transmitter for transmitting signals at a fixed frequency level; and
      a receiver for receiving received signals at the receiver, wherein the received signals are a combination of signals transmitted directly from the transmitter to the receiver and forward scattered signals reflected off the targeted water surface, wherein the transmitter and the receiver are spatially arranged with respect to each other at extreme ends of the targeted water surface;
   a computer-readable medium bearing a program code for monitoring and determining a sea state, and including one or more program code segments for:
      receiving the received signals from the radar receiver;
      mapping an interference pattern tracking energy changes based on received signals;
      determining an instantaneous surface water height of the targeted water surface based on the mapped interference pattern.

13. The system of claim 12, wherein the one or more program code segments computer further provide for:
   repeating the determining of an instantaneous surface water height a plurality of times to obtain a plurality of instantaneous surface water heights;
   generating a surface spectrum of said targeted surface water based on the plurality of instantaneous surface water heights.

14. The system of claim 13, wherein in the determining of the instantaneous water height, the instantaneous surface water height is given by the equation:

$$\delta = \frac{H_X + H_R \pm \frac{1}{\kappa}\sqrt{\left[\arccos\left(\frac{1}{2}|E_C| - 1\right) + 2\pi n + \kappa R_{DP}\right]^2 - \kappa^2 R^2}}{2}$$

wherein $\delta$ is the instantaneous height relative to a mean water height, $H_X$ is the height of the radar transmitter above the mean water height, $H_R$ is the height of the radar receiver above the mean water height, $\kappa$ is the wave number for the radar system in which $\kappa = 2\pi/\lambda$ wherein $\lambda$ is the wavelength of radar waves, R is the horizontal distance between the radar transmitter and the radar receiver, n is an integer, $E_C$ is an instantaneous calibrated measured field at the receiver, and $R_{DP}$ is the direct path length of the distanced traveled by waves transmitted directly from the radar transmitter to the radar receiver and is given by the equation;

$$R_{DP} = \sqrt{R^2 + (H_X - H_R)^2}.$$

15. The system of claim 13, wherein in the arrangement of the transmitter and receiver at extreme ends of the targeted water surface, a direction of signal transmission from the transmitter to the receiver is substantially parallel to a wind direction so that waves generated in the targeted water are substantially perpendicular to the direction of the transmission.

16. The system of claim 13, wherein in the arrangement of the transmitter and receiver at extreme ends of the targeted water surface, a direction of signal transmission from the transmitter to the receiver is substantially perpendicular to a wind direction so that waves generated in the targeted water are substantially parallel to the direction of the transmission.

17. The system of claim 14, wherein the transmitter is configured to transmit fixed frequency signals at a frequency between about 8 GHz and about 12 GHz.

18. The system of claim 14, wherein in the narrowband radar arrangement above the targeted water surface the radar transmitter and the radar receiver are spatially separated by about 1 km to about 2 km.

* * * * *